United States Patent
Schliwa-Bertling et al.

(10) Patent No.: US 9,264,199 B2
(45) Date of Patent: Feb. 16, 2016

(54) DUAL TRAINING SEQUENCE CODES

(71) Applicant: Telefonaktiebolaget L M Ericsson (publ), Stockholm (SE)

(72) Inventors: Paul Schliwa-Bertling, Ljungsbro (SE); Mårten Sundberg, Årsta (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 101 days.

(21) Appl. No.: 13/978,414

(22) PCT Filed: Mar. 18, 2013

(86) PCT No.: PCT/SE2013/050292
§ 371 (c)(1),
(2) Date: Jul. 5, 2013

(87) PCT Pub. No.: WO2013/158013
PCT Pub. Date: Oct. 24, 2013

(65) Prior Publication Data
US 2014/0078977 A1    Mar. 20, 2014

Related U.S. Application Data

(60) Provisional application No. 61/635,956, filed on Apr. 20, 2012.

(51) Int. Cl.
*H04L 5/00* (2006.01)
*H04L 27/00* (2006.01)

(52) U.S. Cl.
CPC .......... *H04L 5/0053* (2013.01); *H04L 27/0008* (2013.01)

(58) Field of Classification Search
CPC ...... H04L 5/00; H04L 5/0053; H04L 27/0008
USPC ........................................................ 370/329
See application file for complete search history.

(56) References Cited

U.S. PATENT DOCUMENTS

| | | | |
|---|---|---|---|
| 7,933,355 B2* | 4/2011 | Xin | H04L 25/0226 375/295 |
| 8,320,312 B2* | 11/2012 | Olsson | H04W 72/14 370/329 |

(Continued)

OTHER PUBLICATIONS

Qualcomm, 3rd Generation Partnership Project. "TSC Signaling for MUROS." 3GPP TSG GERAN #40, Tdoc GP-081492, Miami, Florida, USA, Nov. 17-21, 2008.*

(Continued)

*Primary Examiner* — Charles C Jiang
*Assistant Examiner* — Kyaw Z Soe
(74) *Attorney, Agent, or Firm* — Patents on Demand, P.A.; Brian K. Buchheit; Scott M. Garrett

(57) ABSTRACT

A Mobile Station, an MS (700), for a GERAN system, the MS (700) being arranged (705, 710, 750, 730) to receive bursts from a Base Transceiver Station, a BTS, each of said bursts being modulated with a modulation type chosen from one of a number of modulation types. The MS is arranged (730, 740) to identify bursts from the BTS which may comprise information for the MS by identifying if a Training Sequence Code, a TSC, which is comprised in received bursts corresponds to a TSC which the MS has been assigned, the MS being arranged (705, 710, 750, 730, 740) to be assigned a first and a second TSC to be used for at least one of said modulation types.

17 Claims, 10 Drawing Sheets

(56) References Cited

U.S. PATENT DOCUMENTS

| | | | |
|---|---|---|---|
| 8,817,713 B2* | 8/2014 | Bergstrom | H04W 76/021 370/328 |
| 2010/0074104 A1* | 3/2010 | Ryu | H04L 1/1854 370/228 |
| 2011/0077017 A1* | 3/2011 | Yu | H04L 5/0007 455/452.1 |
| 2011/0194410 A1* | 8/2011 | Bergstrom | H04W 76/021 370/235 |
| 2013/0034054 A1* | 2/2013 | Wu | H04L 27/2607 370/328 |

OTHER PUBLICATIONS

3rd Generation Partnership Project. "TSC Signaling for MUROS." 3GPP TSG GERAN #40, GP-081492, Miami, Florida, USA, Nov. 17-21, 2008.*

3rd Generation Partnership Project. "MUROS Intra-Cell Interference and TSC Design." 3GPP TSG GERAN #38, Tdoc GP-080602, Agenda 7.1.5.6, Malaga, Spain, May 12-16, 2008.

3rd Generation Partnership Project. "TSC Signaling for MUROS." 3GPP TSG GERAN #40, Tdoc GP-081492, Miami, Florida, USA, Nov. 17-21, 2008.

3rd Generation Partnership Project. "Introduction of TSC Set Signalling for VAMOS." 3GPP TSG-GERAN Meeting #41, GP-090379, St. Julians, Malta, Feb. 16-20, 2009.

3rd Generation Partnership Project. 3GPP TS 45.002, V9.6.0 (Mar. 2013). 3rd Generation Partnership Project; Technical Specification Group GSM/EDGE Radio Access Network; Multiplexing and multiple access on the radio path (Release 9), Mar. 2012.

* cited by examiner

Burst Format

USF in Burst

|  |  | Data for user | |
|---|---|---|---|
|  |  | Legacy MS (TSC A) | New MS (TSC A&B) |
| USF for user: | Legacy MS (TSC A) | OK | OK |
|  | New MS (TSC A&B) | OK | OK |

Fig. 5

| Bit | | TSC 1 | TSC 2 |
|---|---|---|---|
| MSB | LSB | | |
| 0 | 0 | TSC set 1 | TSC set 1 |
| 0 | 1 | TSC set 1 | TSC set 2 |
| 1 | 0 | TSC set 2 | TSC set 1 |
| 1 | 1 | TSC set 2 | TSC set 2 |

Fig. 6

DUAL TRAINING SEQUENCE CODES

TECHNICAL FIELD

The present invention discloses a Mobile Station, an MS, and a Base Station Controller, a BSC, for a GERAN system.

BACKGROUND

In GERAN systems, the Mobile Stations, the MSs, receive bursts transmitted from a BTS, a Base Transceiver Station. A burst comprises information such as data and uplink status flags, USFs, for the MS, and also comprises a Training Sequence Code, a TSC. The BTS can modulate each burst in a number of different ways, i.e. using one of a number of different modulations, and for each modulation type, there exists one set of TSCs. At present, these sets of TSCs comprise 8 TSCs per set.

Each MS is assigned a TSC, which is used by the MS for burst time synchronization, and also in order to estimate the radio channel and to perform blind modulation detection, i.e. to blindly detect the modulation that is used for transmitting the received burst. If the TSC comprised in the burst corresponds to the TSC assigned to the MS, these three operations (synchronization, channel estimation and blind modulation detection) can be performed successfully, and the MS thereby knows that the information comprised in the burst may be for the MS. Whether or not the information comprised in the burst is in fact for the MS is then determined by the MS by examining the information comprised in the burst.

The TSCs are a sequence of, at present, 26 or 31 bits, which is placed as a so called midamble in a burst.

The bursts in the downlink are transmitted to the MS from the BTS, but the information for the MS comes from a Base Station Controller, a BSC, which controls the BTS and uses the BTS to communicate with the MS. The bursts are received by the MS on a Temporary Block Flow, a TBF, between the MS and the BSC, where the TBF goes via the BTS.

SUMMARY

It is an object of the invention to provide an MS for a GERAN system with improved use of TSCs.

This object is obtained by means of a Mobile Station, an MS, for a GERAN system. The MS is arranged to receive bursts from a Base Transceiver Station, a BTS, where each of said bursts is modulated with a modulation type chosen from one of a number of modulation types. The MS is arranged to identify bursts from the BTS which may comprise information for the MS by identifying if a Training Sequence Code, a TSC, which is comprised in received bursts corresponds to a TSC which the MS has been assigned. The MS is arranged to be assigned a first and a second TSC to be used for at least one of said modulation types.

By virtue of the fact that the MS can be assigned both a first and a second TSC for at least one of said modulation type, a number of advantages are gained, for example that the "TSC space" is increased, since the amount of TSCs which can be used for one and the same modulation type increases.

In embodiments of the MS, the information for the MS which may be comprised in said bursts comprises Uplink Status Flags, USFs, piggy backed ACK/NACK, PAN, and data.

In order to enable easier reception of PANs, USFs and data by an MS which can use a first and a second TSC for one and the same modulation type, the MS is in embodiments arranged to detect information in the form of one or more of PANs, data and USFs in bursts in which the first TSC has been used and to detect information in the form of one or more of PANs, data or USFs in bursts in which the second TSC has been used. In other words, one or both TSCs can be "earmarked" for the transmission of one or more of PANs, data or USFs to the MS.

In embodiments, the MS is arranged to be assigned the first TSC from a first or a second set of TSCs and the second TSC from a first or a second set of TSCs. In such embodiments, since the TSCs can be picked from two different sets of TSCs, two sets of TSCs which are used for one and the same modulation type can be designed so that their cross correlation is low. In addition to this, one of the two sets of TSCs can be a new set of TSCs which have improved cross correlation within the set, as well as between TSCs in the new and already defined TSC sets for either the same or different modulations of the new and already defined sets.

In embodiments, the MS is arranged to receive the bursts via a Temporary Block Flow, a TBF, between a Base Station Controller, a BSC and the MS, which TBF goes through said BTS, and the MS is arranged to be assigned the first and second TSC by the BSC when the TBF is being established or is being re-configured in either Dual Transfer Mode, DTM, assignment, or in Packet Switched Handover Commands.

In embodiments, the MS is arranged to signal the BSC of its ability to use a first and a second set of TSCs when the TBF is being established. In some such embodiments, the MS is arranged to perform this signaling via the Information Element Radio Access Capability.

The object stated above is also obtained by means of a Base Station Controller, a BSC, for a GERAN system. The BSC is arranged to assign a first Training Sequence Code, a TSC, to a Mobile Station, an MS, for use in the reception of bursts from a Base Transceiver Station, a BTS. Each of the bursts is modulated by the BTS with a modulation type chosen from one of a number of modulation types, and the BSC is also arranged to assign the MS a second TSC. The first and second TSC are used by the MS for at least one of said modulation types in order to identify received bursts from the BTS which may comprise information for the MS.

In embodiments, the BSC is arranged to choose the first TSC from a first or a second set of TSCs and the second TSC from a first or a second set of TSCs.

In embodiments, the BSC is arranged to establish a Temporary Block Flow to the MS via the BTS, and to allocate the MS the first and second TSC when the TBF is being established or is being re-configured either in Dual Transfer Mode, DTM, assignment, or in Packet Switched Handover Commands.

In embodiments, the BSC is arranged to be informed by the MS that the MS is capable of using a first and a second TSC in the reception of bursts modulated with at least one of said modulation types.

BRIEF DESCRIPTION OF THE DRAWINGS

The invention will be described in more detail in the following, with reference to the appended drawings, in which FIG. 5 is a table which shows transmission of USFs and data to the same or different MSs in one and the same burst, and FIG. 6 is a table which shows signaling to the MS of how the use of different TSC sets can be signaled to an MS, FIG. 8 shows a block diagram of a BSC, and.

DETAILED DESCRIPTION

Figure 1:
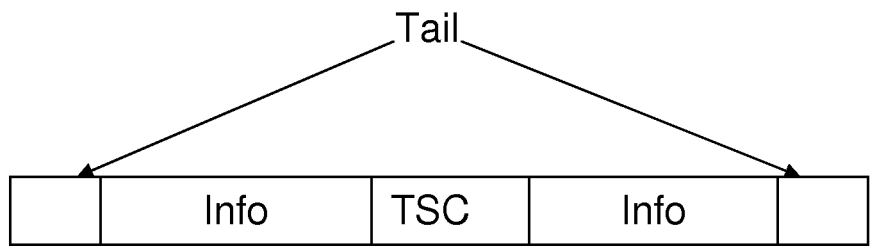
FIG. 1 shows the structure of a burst from a BTS.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

In order to facilitate the understanding of the invention, some prior art information will first be discussed briefly: in a GERAN system, when a Base Station Controller, a BSC, transmits information to an MS, this is done via a Base Station Transceiver, a BTS. The BTS transmits bursts to the MSs in a cell, and each burst is modulated by the BTS according to one of a number of different modulation types. Each burst comprises the information from the BSC and a Training Sequence Code, a TSC, which is used by the MSs in order to identify bursts which may comprise information intended for them.

An MS can identify if a received burst from the BTS may comprise information for the MS or not since each MS has been assigned a certain TSC, and an MS attempts to use the TSC it has been assigned in order to perform the following operation on received bursts: burst time-synchronization, estimate the radio channel, and perform blind modulation detection, i.e. blindly detecting the modulation that is used for transmitting the received burst. If these operations succeed, a received burst may comprise information intended for the MS. The use of the word "may" will be explained later in this text, but it should be noted that a burst on which these operations are performed successfully does not necessarily comprise information intended for the MS.

A TSC is (at present) a field which is 26 or 31 symbols long, and is placed in the midamble of a burst, as shown in FIG. 1. As shown in FIG. 1, on either side of the TSC, there is information for the MS, in the form of encrypted bits, and at both ends of the burst, there are so called tail fields. The information for the MSs can comprise piggy backed ACK/NACKS, PANs, Uplink Status Flags, USFs, and data.

At present, there exist 8 TSCs for each modulation type in a GERAN system. As will be realized, it would be beneficial if this number could be increased, thereby increasing the "TSC space" of the GERAN system. Other advantages which it is desired to be gained over the 8 available TSCs include improved cross correlation between the different TSCs in, and between set of TSCs.

The MS disclosed in this text has the ability to use two TSCs simultaneously, and can thus be assigned two TSCs. The MS has this ability for at least one of the modulation types available to the BTS, although, suitably, the MS has this ability for all of the modulation types available to the BTS.

In addition, in embodiments, the MS is arranged to be assigned the two TSCs from the same set of TSCs or from two different sets of TSCs, i.e. one TSC from one set of TSCs and the other TSC from another set of TSCs. In embodiments with two different sets of TSCs, an additional set of TSCs can be introduced for each modulation type for which the MS has this ability.

Figure 2:
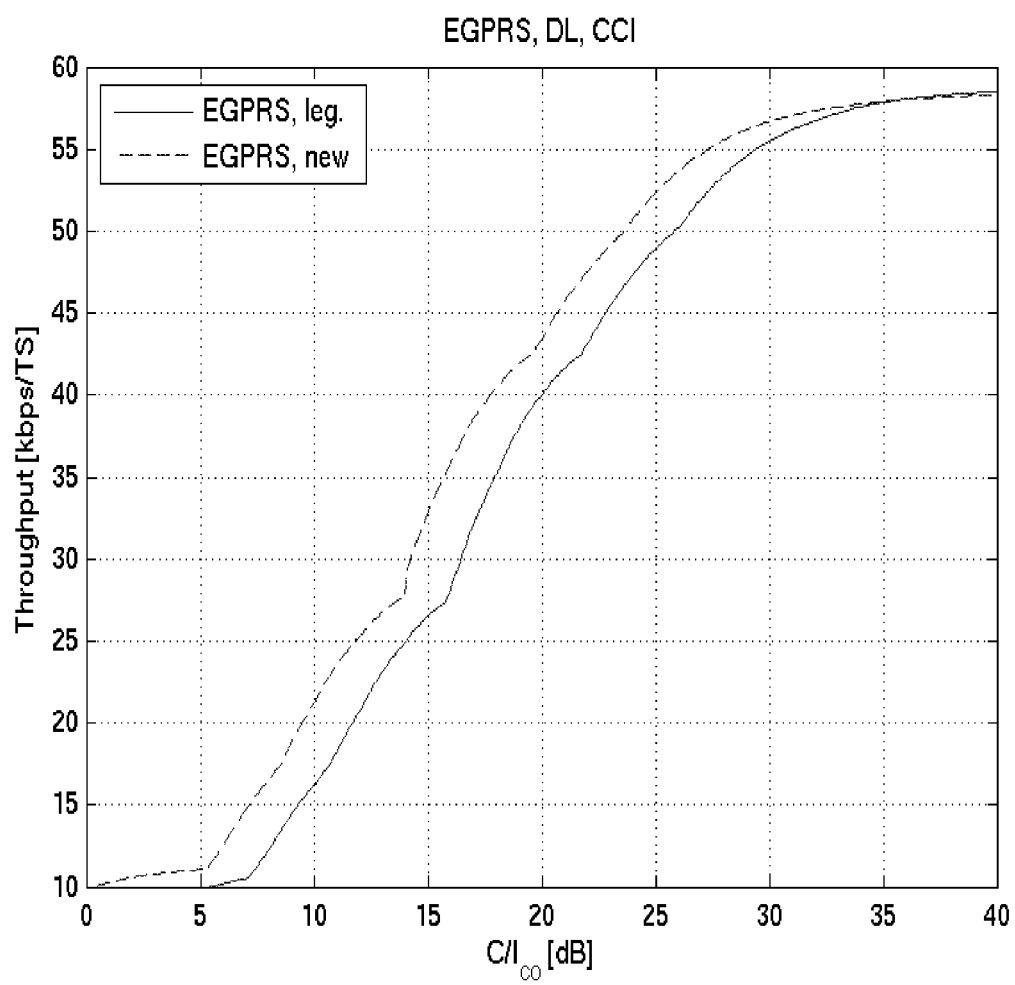
FIG. 2 shows the performance of a new TSC and a "legacy" TSC.
Figure 3:
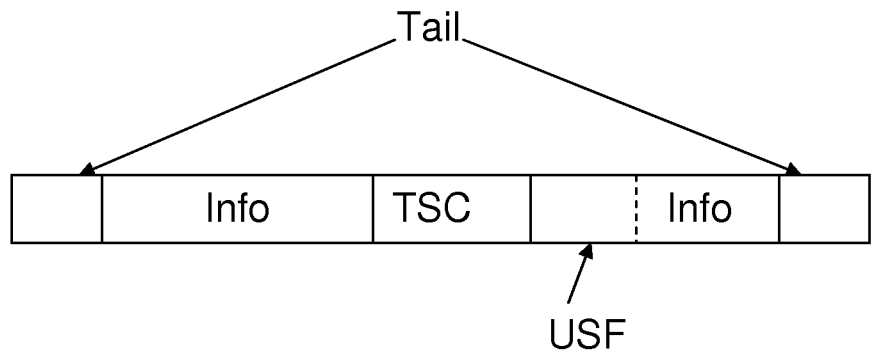
FIG. 3 shows the structure of a burst from a BSC in more detail.

This additional set of TSCs can be designed with, for example, improved cross correlation properties, as compared with the existing sets of TSCs for the same modulation. Increased cross correlation properties of a TSC set can serve to improve the radio link performance between the BTS and the MS, as shown in FIG. 2, which shows the average performance across different TSC combinations of a current TSC set ("EGPRS leg."), as compared to the average performance of a newly designed TSC set ("EGPRS new") with improved cross correlation qualities. The performance which is shown in FIG. 2 is the throughput as measured in kbps/TS as a function of C/I, Carrier to Interference ratio. As can be seen, in FIG. 2, the performance is improved when using the TSC set ("EGPRS new") with improved cross correlation qualities As mentioned previously, the BSC transmits information to an MS via bursts from the BTS. The information can comprise data as well as Uplink Status Flags, USFs, and piggy backed ACK/NACKs, PANs. This is shown in FIG. 3, which, as an example, shows a burst which comprises an USF, and in which it can be seen that the USFs are usually placed close to the TSC field.

Figure 4:
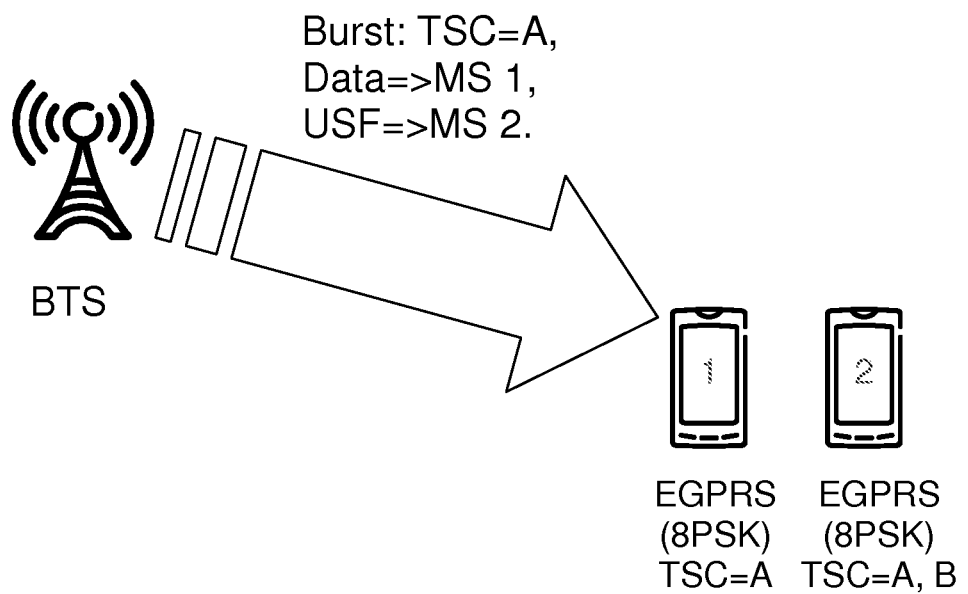
FIG. 4 shows how a burst can comprise an USF for one MS and data for another MS.

In embodiments, the fact that an MS can be assigned two TSCs, and is also arranged to use them, needs to be taken into account by the BTS in the transmission in one and the same burst from a BTS of, for example, a USF to one MS and data to another MS, as illustrated in FIG. 4: As shown in FIG. 4, a burst from a BTS comprises data intended for one MS ("MS 1") and an USF for another MS ("MS 2"). MS 1 is an MS which can only use one TSC, here referred to as TSC A, but MS 2 is an MS which can use two TSCs simultaneously, as described above. In this case, MS B uses TSC A as well as another TSC here referred to as TSC B. The TSC used in the burst shown in FIG. 4 is TSC A.

Thus, MS 1 receives the burst and uses TSC A to demodulate the burst and identifies that the data in the burst is identified for it, while the USF is not. However, MS B also receives the burst and uses TSC A to demodulate the burst, and identifies that the data in the burst is not identified for it, while the USF is. This result, i.e. the successful reception by both MSs of those parts of the burst which is intended for them was due to the selection by the BTS of a TSC for the burst which the BTS knew that both MS 1 and MS 2 had been assigned and therefore could use. As indicated, MS 2 is also capable of using TSC B, but if TSC B had been used in the burst, then MS 1 would not have been able to demodulate the burst, and would therefore not have received the information in the burst intended for it.

It should be mentioned that, as explained above, both MS 1 and MS 2 are able to demodulate the burst by means of TSC A, but they can then see if one or more of the data, the USF and the PAN comprised in the burst is intended for them by means of addressing information comprised in the burst. This will be explained in more detail later in this text.

The fact that an MS, as disclosed herein, is able to be assigned and use two TSCs can be used in order to "ear-mark" at least one of the TSCs for one or more of PANs, data, or USFs. In such embodiments, for example, an MS is then arranged to detect data, PANs and USFs in bursts in which one of "its" TSCs has been used and to detect information in the form of only one or more of PANs, USFs or data in bursts in which the other of "its" TSCs has been used. This will serve to decrease the effort from the side of the MS in the demodulation of bursts from the BTS.

FIG. 5 is a table which shows how an MS ("New MS") which can use two TSCs, shown as TSC A and B in FIG. 5, should be used in a GERAN system together with an MS ("legacy MS") which can only use one TSC, TSC A, in order to achieve the effect shown in FIG. 4, i.e. both "legacy" (pre-invention) MSs and new MSs receiving the parts of a burst which is intended for them: as shown in FIG. 5, if a burst comprises a USF (a PAN could equally well have been used in this example) for the legacy MS and data for the new MS, then the burst is transmitted using TSC A, and both MSs will decode the burst using TSC A and extract the part of the burst (data/USF) that is intended for them. Similarly, if a burst comprises a USF for the new MS and data for the legacy MS, then the burst is transmitted using TSC A, and both MSs will decode the burst using TSC A and extract the part of the burst (data/USF) that is intended for them. The table of FIG. 5 also shows the cases in which a burst comprises USF and data for one and the same MS, but these cases will not be commented on here, since the capabilities of multiple MSs in this case need not be considered.

Above, it has been mentioned that an MS can see if a PAN, a USF and data which are comprised in a burst are intended for the MS. As mentioned briefly previously in this text, this is done using addressing information comprised in burst regarding the PAN, the USF and the data, and although the mechanism used for this is not an intrinsic part of the invention, it will be described briefly here:

In order for an MS to see that an USF comprised in a burst is intended for that MS, the MS needs to:
1. Detect the modulation type used in the burst, which is done by means of the MS being able to use the TSC of the burst,
2. Since the MS detects the modulation type, the MS knows where in the burst that the USF is located,
3. The MS then checks if the value of the USF is the one that the MS has been assigned, in which case the MS knows that the USF is intended for the MS.

In order for an MS to see that the data comprised in a burst is intended for that MS, the MS needs to:
1. Detect the modulation type used in the burst, which is done by means of the MS being able to use the TSC of the burst,
2. Since the MS detects the modulation type, the MS knows where in the burst that the so called stealing flag bits are located,
3. The MS decodes the stealing flag bits, and thereby finds out the kind of header used in the burst,
4. The MS decodes the header, and can then see if the TFI field in the header has the value that the MS has been assigned, in which case the MS knows that the data in the burst is intended for the MS.

In order for an MS to see that the PAN comprised in a burst is intended for that MS; the MS needs to:
1. Detect the modulation type used in the burst, which is done by means of the MS being able to use the TSC of the burst,
2. Since the MS detects the modulation type, the MS knows where in the burst that the so called stealing flag bits are located,
3. The MS decodes the stealing flag bits, and thereby finds out the kind of header used in the burst,
4. The MS decodes the header, and can then see if the PAN1 field in the header is set, in which case the MS knows that the PAN has been included in the radio block by the network.
5. To determine if the PAN is intended for that MS the TFI assigned the MS is XORed with the parity bits of the decoded PAN field.

As mentioned previously, the BSC sends its information to the MS or within the context of a Temporary Block Flow, a TBF, to the MS via the BTS. The two TSCs are suitably assigned to the MS by the BSC when the TBF is being established between the MS and the BSC. Suitably, this is done by means of a 2-bit field called the TSC_Selector field, which is, for example, coded as shown in FIG. 6: The MSB of the 2-bit field indicates from which TSC set that the first TSC ("TSC 1") is to be taken, and the LSB indicates from which TSC set that the second TSC ("TSC 2") is to be taken. The bits in the TSC_Selector field can, for example, signify the TSC sets in the following manner: The least significant bit refers to the TSC field in the Packet Data Channel Description IE and the most significant bit refers to the TSC_Additional field in the IA Rest Octet IE.2

Thus, by means of the table of FIG. 6, the MS knows from which set or sets that the two TSCs should be taken. In order for the MS to know which of the individual TSCs that should be used from these set(s), the BSC signals a number in the range of 0-7 (i.e. a 3-bit field) to signify the first TSC, a procedure which is used in legacy MSs as well, and then uses a new field, here called the TSC_Additional field (also a 3-bit field) in order to signal the MS the value of the second TSC, also a number in the range of 0-7.

Naturally, the upper range limit, i.e. 7, , can be changed if the system allows or needs it, in which case more bits need to be assigned to these fields. The TSC_Additional field is suitably introduced in the standard 3GPP TS 45.002.

An alternative to the use of the TSC_Additional field as described above is to always let the MS use the "paired" TSC if the two TSC are to be taken from different sets of TSCs: in other words, if the first TSC is to be TSC number X from TSC set N and the second TSC is to be taken from TSC set M, the MS can be arranged to always use TSC number X from set M as well.

In addition, the MS is suitably arranged to signal to the BSC when the TBF is being established that the MS has ability to use a first and a second set of TSCs, either alternatively, or, in embodiments, simultaneously, i.e. to use one TSC from either set. Suitably, the MS performs this signaling via the Information Element Radio Access Capability. As an example, a one-bit field named E_TSC Capability can be introduced and used to signify the ability to use two TSCs, where the value "0" could serve to signify the absence of such an ability, and the value "1" could serve to signify the such an ability.

In addition, if the dual TSCs should not be used for all of the modulation types available to the BTS, but only to a limited set of those modulation types, this is suitably signaled to the MS when the TBF is being established, so that only one of the TSCs is used by the MS for the other modulation types. If the limitation regarding the use of two TSCs for more than a certain number of modulations lies in the MS, the MS suitably signals this to the BSC.

Figure 7:
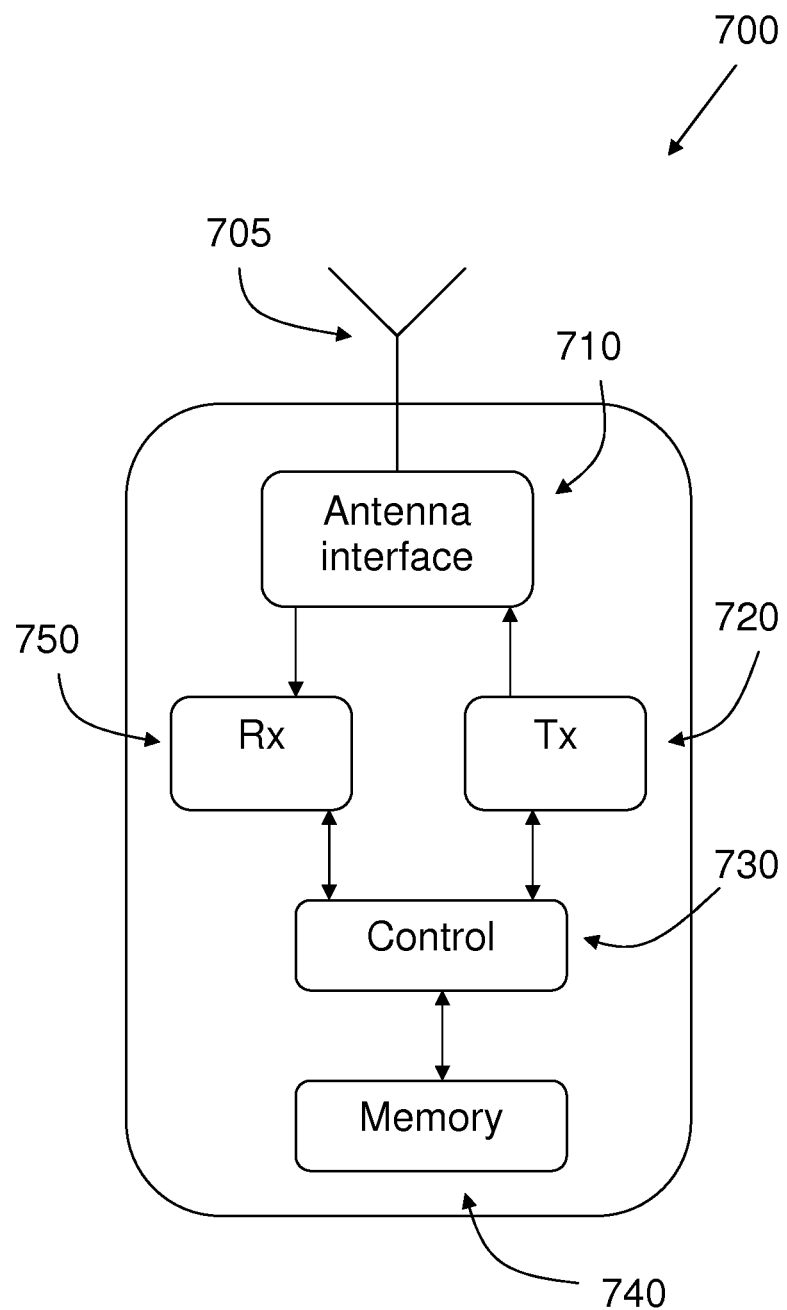
FIG. 7 shows a block diagram of an MS.

FIG. 7 shows a schematic block diagram of an MS 700. As shown in FIG. 7, the MS 700 comprises an antenna unit 705 connected to an antenna interface 710. The antenna interface 710 is used to connect a receive unit ("Rx") 750 and a transmit unit ("Tx") 720 to the antenna unit 705. The function of the receive unit and of the transmit unit is controlled by means of a control unit 730, which uses a memory unit 740. The TSC sets of the various modulation types may, for example, be stored in the memory unit 740. The antenna unit 705, the antenna interface 710 and the receive unit 750 are used to receive the information regarding the MS's two assigned TSCs from the BSC. This information is suitably transmitted by the BSC to the MS when the BSC and the MS set up a TBF between them.

The receive unit 750 together with the control unit 730 synchronize the information sent to the MS over the TBF, and estimate the radio channel and perform blind modulation detection.

The receive unit 750 together with the control unit 730 serve to detect data and USFs in the manner which has been described previously in this text.

Figure 8:
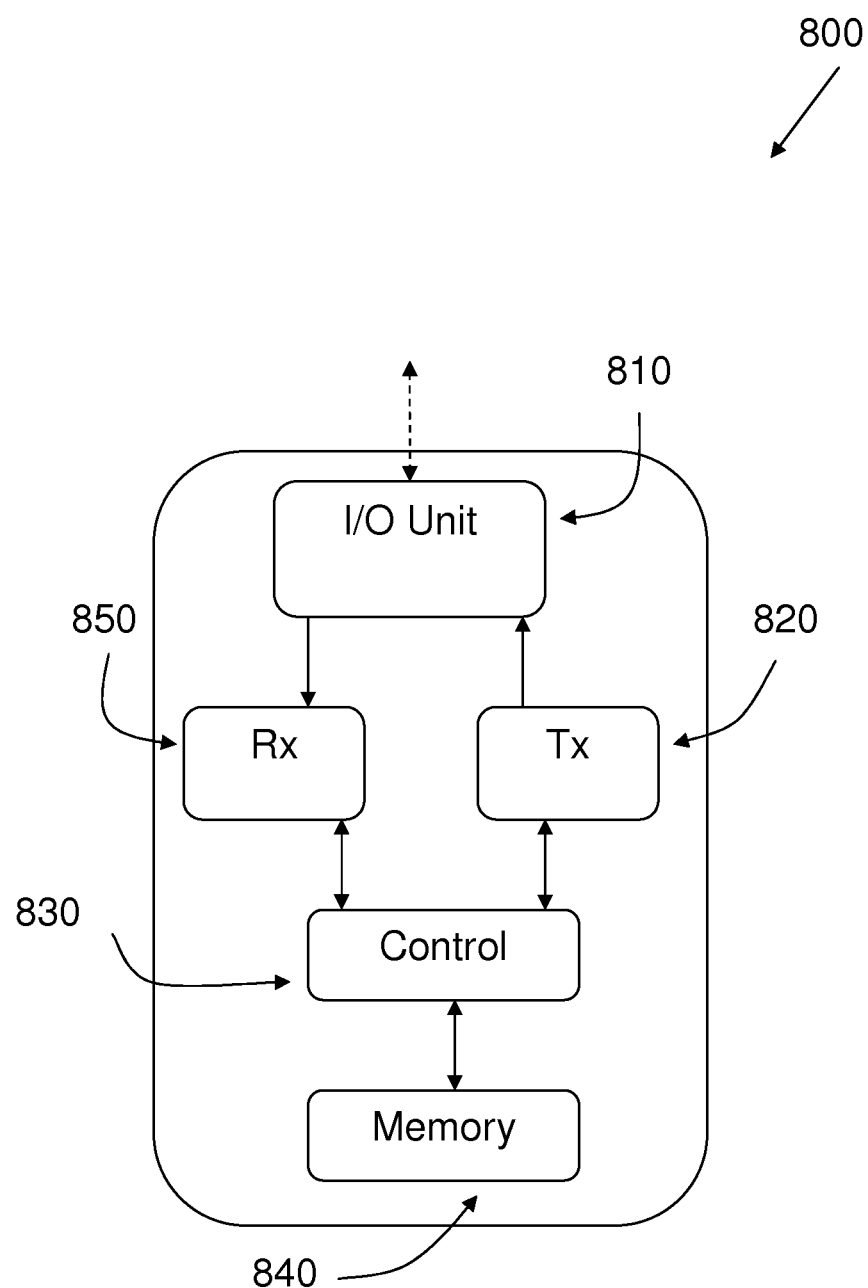

FIG. 8 shows a schematic block diagram of a BSC 800. As shown in FIG. 8, the BSC 800 comprises an I/O unit 810, which is used to communicate with other units in the GERAN system, e.g. a BTS. Often a BSC and one or more BTSs will be co-located as a so called BSS, Base Station Subsystem, in which case the BSC and the BTS can communicate with each other via respective units such as the I/O-unit 810. In other cases, longer landline connections may be necessary between the BSC and an associated BTS.

The I/O unit 810 connects to a receive unit ("Rx") 850 and a transmit unit ("Tx") 820. The function of the receive unit 850 and of the transmit unit 820 is controlled by means of a control unit 830, which uses a memory unit 840, and the receive unit 850 is used to receive information, e.g. from an MS via the BTS over a TBF, and conversely, the transmit unit 820 is used to transmit information, e.g. to an MS via the BTS over a TBF.

Regarding the memory unit 840, the TSC(s) to be used by each MS may, for example, be stored in the memory unit 840, as well as information on the capabilities of each MS which the BSC controls, e.g. the MSs' capabilities when it comes to handling one or more TSC per modulation type.

The I/O unit 810, as well as the transmit unit 820, the control unit 830 and the memory unit 840 are used by the BSC 800 in order to assign the TSC(s) to the MSs. These units are also used by the BSC to establish a Temporary Block Flow to the MS via a BTS, and to assign the MS its TS when the TBF is being established or is being re-configured either in Dual Transfer Mode, DTM, assignment, or in Packet Switched Handover Commands.

The I/O unit 810, as well as the receive unit 850 and the control unit 830 are used by the BSC 800 in order to be informed by an MS that the MS is capable of using a first and a second TSC in the reception of bursts modulated with at least one modulation type.

Figure 9:
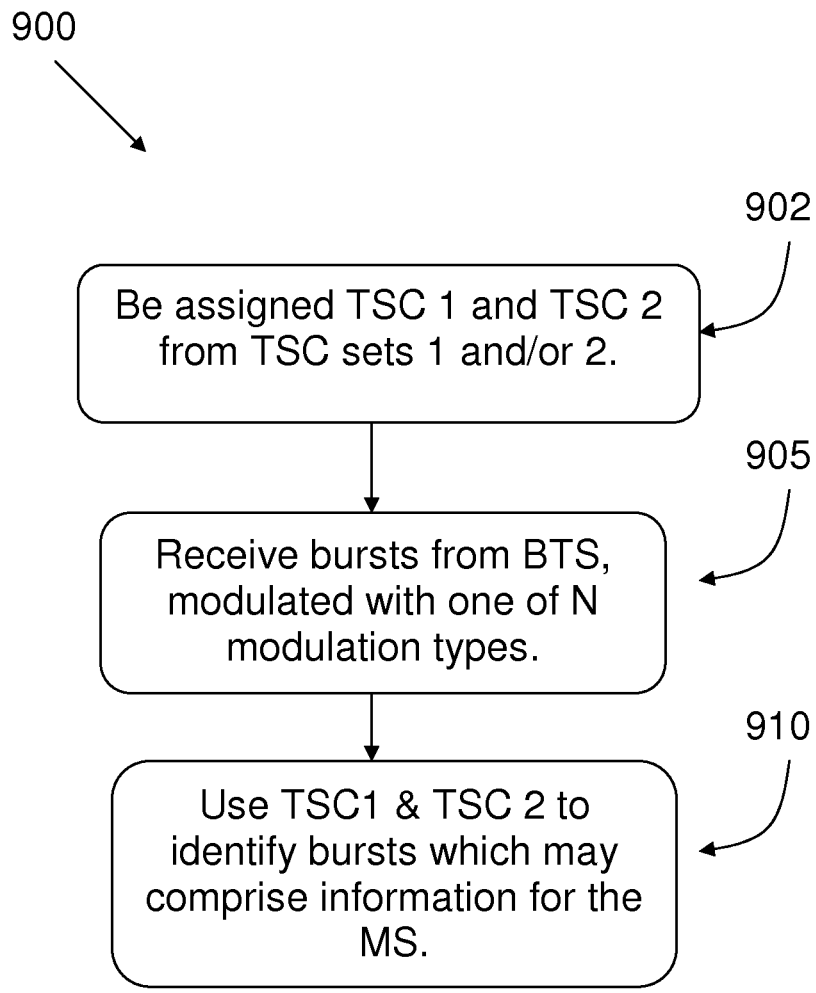
FIG. 9 shows a flow chart of a method for use in an MS.

FIG. 9 shows a schematic flow chart of a method 900 for use in a Mobile Station, an MS, for a GERAN system. The method 900 comprises:
    receiving bursts, step 905, from a Base Transceiver Station, a BTS, each of said bursts being modulated with one of a number of modulation types,
    identifying bursts, step 910, from the BTS which may comprise information for the MS by identifying if a TSC comprised in received bursts corresponds to a first or a second TSC which the MS has been assigned.

In embodiments of the method 900, the information which may be comprised in said bursts comprises uplink status flags, USFs data and a PAN.

In embodiments, the method 900 comprises, step 902, the MS being assigned the first TSC from a first or a second set of TSCs and the second TSC from the first or the second set of TSCs.

In embodiments, the method comprises detecting information in the form of one or more of data, piggy backed ACK/NACKs, PANS, and USFs in bursts in which the first TSC has been used and detecting information in the form of one or more of PANs, data or Uplink Status Flags, USFs, in bursts in which the second TSC has been used.

In embodiments, the method 900 comprises:
    receiving said bursts on a Temporary Block Flow, a TBF, between the MS and a Base Station Controller, a BSC, which TBF goes through said BTS,
    being assigned said TSCs by the BSC while the TBF is being established or re-configured either in Dual Transfer Mode, DTM, assignments, or PS Handover Commands.

In embodiments, the method 900 comprises signaling the BSC while the TBF is being established of the MS's ability to use a first and a second set of TSCs.

Figure 10:
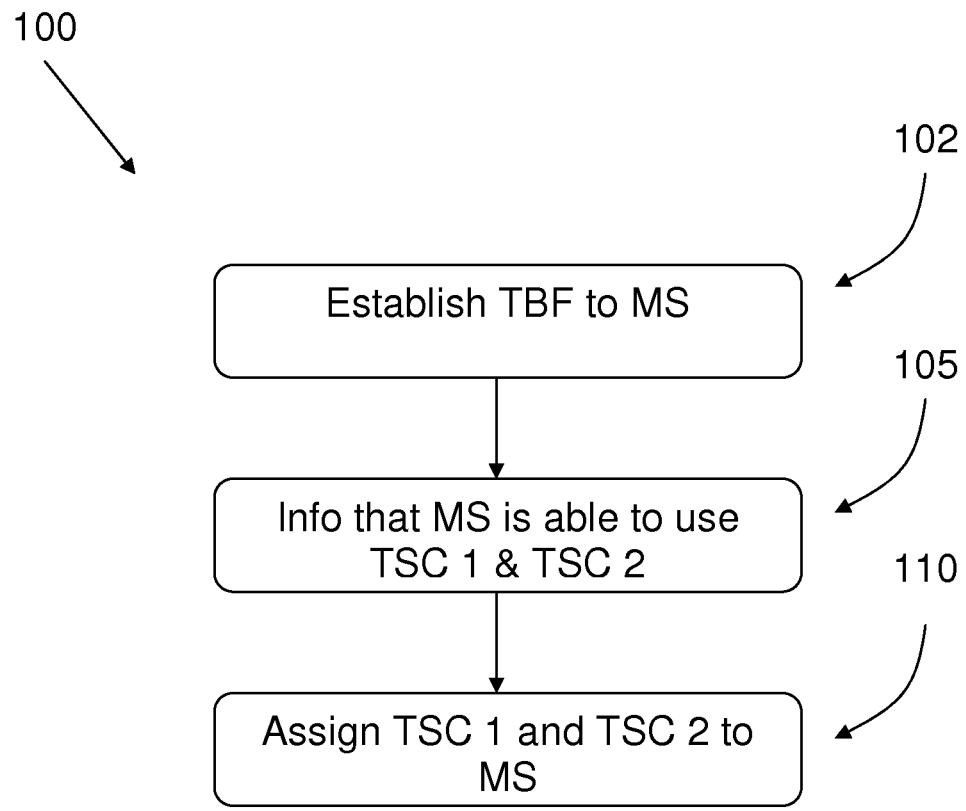
FIG. 10 shows a flow chart of a method for use in a BSC.

FIG. 10 shows a schematic flow chart of a method 100 for use in a Base Station Controller, a BSC, for a GERAN system.

The method 100 comprises, step 110, assigning a first and a second Training Sequence Code, a TSC, to a Mobile Station, an MS, for use in the reception of bursts from a Base Transceiver Station, a BTS. Each of said bursts is modulated by the BTS with a modulation type chosen from one of a number of modulation types, and the first and the second TSC are used by the MS for at least one of said modulation types to identify received bursts from the BTS which may comprise information for the MS.

In embodiments, the method 100 comprises:
    establishing, step 102, a Temporary Block Flow, a TBF, to the MS via the BTS,
    assigning the MS its TSCs when the TBF is being established or being re-configured either in Dual Transfer Mode, DTM, assignments, or in PS Handover Commands.

In embodiments, the method 100 comprises, step 105, being informed by the MS that the MS is capable of using a first and a second TSC in the reception of bursts modulated with at least one of said modulation types.

In embodiments, the method 100 comprises choosing the first TSC from a first or a second set of TSCs and choosing the first TSC from a first or a second set of TSCs.

It should be mentioned that although the use of two TSCs by an MS has been described above as being used only in the down link direction, i.e. to the MS, the same or a similar principle could be used in the uplink direction, i.e. that an MS could be arranged to use two TSCs for transmission in the uplink direction. In such cases, one or both of the TSCs used in the downlink direction could also be used in the uplink direction. In addition, even in MSs that can only use one TSC in the uplink direction but two TSCs in the downlink direction, one of the downlink TSCs could be re-used as the uplink TSC.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A Mobile Station (MS) for a GSM EDGE Radio Access Network (GERAN) system, the MS being arranged to:
   receive an assignment that allocates to the MS a first Training Sequence Code (TSC) and a second TSC, from among a number of TSCs, for at least one modulation type from a number of modulation types;
   receive bursts from a Base Transceiver Station (BTS), each of said bursts including a Training Sequence Code (TSC) chosen from among said number of TSCs and being modulated with a modulation type chosen from said number of modulation types; and
   identify whether a given received burst from the BTS comprises information for the MS, by determining whether the TSC comprised in the given received burst from the BTS corresponds to either one of the first and second TSCs allocated to the MS, wherein the MS is arranged to be assigned the first TSC and the second TSC by a Base Station Controller (BSC) using a 2-bit TSC selector field when a temporary block flow (TBF) is being established between the MS and the BSC, wherein the MS is arranged to receive said bursts via said TBF between said BSC and the MS, which TBF goes through said BTS, and where the MS is arranged to be assigned said first and second TSCs by the BSC when the TBF is being re-configured, either in Dual Transfer Mode (DTM) assignment, or in Packet Switched Handover Commands.

2. The MS of claim 1, wherein the information in the received burst that may be for the MS comprises Uplink Status Flags (USFs), and piggy backed ACK/NACKs (PANs), and data.

3. The MS of claim 1, wherein the MS is arranged to be assigned the first TSC from a first or a second set of TSCs and the second TSC from the first or the second set of TSCs.

4. The MS of claim 1, wherein the MS is arranged to detect information in the form of one or more of data, piggy backed ACK/NACKs (PANs) and uplink status flags (USFs) in bursts in which the first TSC has been used and to detect information in the form of one or more of data, PANs or USFs in bursts in which the second TSC has been used.

5. The MS of claim 1, wherein the MS is arranged to signal the BSC of its ability to use a first and a second set of TSCs when the TBF is being established.

6. The MS of claim 5, wherein the MS is arranged to perform said signaling via the Information Element Radio Access Capability.

7. A Base Station Controller (BSC) for a GSM EDGE Radio Access Network (GERAN) system, the BSC comprising a memory and a processor configured to:
   assign a first Training Sequence Code (TSC) to a first Mobile Station (MS) and to a second MS, for use in the reception of bursts from a Base Transceiver Station (BTS), each of said bursts being modulated by the BTS with a modulation type chosen from one of a number of modulation types;
   assign a second TSC to the second MS, responsive to determining that the second MS is arranged to support simultaneous use of two TSCs; and
   sending a first burst that includes the first TSC, where one part of the first burst is addressed to the first MS and another part of the first burst is addressed to the second MS, and sending a second burst that includes the second TSC, where at least one part of the second burst is addressed to the second MS, wherein the BSC assigns the first TSC and the second TSC to the second MS using a 2-bit TSC selector field when a temporary block flow (TBF) is being established between the MS and the BSC, wherein the second MS is arranged to receive said second burst via said TBF between said BSC and the second MS, which TBF goes through said BTS, and where the second MS is arranged to be assigned said first and second TSCs by the BSC when the TBF is being re-configured, either in Dual Transfer Mode (DTM) assignment, or in Packet Switched Handover Commands.

8. The BSC of claim 7, wherein the BSC is arranged to choose the first TSC from a first or a second set of TSCs and the second TSC from a first or a second set of TSCs.

9. The BSC of claim 7, wherein the BSC is arranged to be informed by the second MS that the second MS is capable of using two TSCs simultaneously.

10. A method for use in a Mobile Station (MS) configured for operation in a GSM EDGE Radio Access Network (GERAN) system, the method comprising:
   receiving an assignment that allocates to the MS a first Training Sequence Code (TSC) and a second TSC, from among a number of TSCs, for at least one modulation type from a number of modulation types;
   receiving bursts from a Base Transceiver Station (BTS), each of said bursts including a Training Sequence Code (TSC) chosen from among said number of TSCs and being modulated with a modulation type chosen from said number of modulation types; and
   identifying whether a given received burst from the BTS may comprise information for the MS, by determining whether the TSC comprised in the given received burst from the BTS corresponds to either one of the first and second TSCs allocated to the MS, wherein the MS is arranged to be assigned the first TSC and the second TSC by a Base Station Controller (BSC) using a 2-bit TSC selector field when a temporary block flow (TBF) is being established between the MS and the BSC, wherein the MS is arranged to receive said bursts via said TBF between said BSC and the MS, which TBF goes through said BTS, and where the MS is arranged to be assigned said first and second TSCs by the BSC when the TBF is being re-configured, either in Dual Transfer Mode (DTM) assignment, or in Packet Switched Handover Commands.

11. The method of claim 10, wherein said information which may be comprised in said bursts comprises uplink status flags (USFs), piggy backed ACK/NACKs (PANs), and data.

12. The method of claim 11, according to which the MS is assigned the first TSC from a first or a second set of TSCs and the second TSC from the first or the second set of TSCs.

13. The method of claim 12, comprising detecting information in the form of one or more of data, PANs and USFs in bursts in which the first TSC has been used and detecting information in the form of one of one or more of data, PANs or USFs, in bursts in which the second TSC has been used.

14. method of claim 10, further comprising signaling the BSC while the TBF is being established of the ability of the MS to use a first and a second set of TSCs.

15. A method for use in a Base Station Controller (BSC) for a GSM EDGE Radio Access Network (GERAN) system, the method comprising;
    allocating a first Training Sequence Code (TSC) to a first Mobile Station (MS) and to a second MS, for use in the reception of bursts from a Base Transceiver Station (BTS), each of said bursts being modulated by the BTS with a modulation type chosen from one of a number of modulation types;
    allocating a second TSC to the second MS, responsive to determining that the second MS is arranged to support simultaneous use of two TSCs; and
    sending a first burst that includes the first TSC, where one part of the first burst is addressed to the first MS and another part of the first burst is addressed to the second MS, and sending a second burst that includes the second TSC, where at least one part of the second burst is addressed to the second MS, wherein the BSC assigns the first TSC and the second TSC to the second MS using a 2-bit TSC selector field when a temporary block flow (TBF) is being established between the MS and the BSC, wherein the second MS is arranged to receive said second burst via said TBF between said BSC and the second MS, which TBF goes through said BTS, and where the second MS is arranged to be assigned said first and second TSCs by the BSC when the TBF is being re-configured, either in Dual Transfer Mode (DTM) assignment, or in Packet Switched Handover Commands.

16. The method of claim 15, further comprising choosing the first TSC from a first or a second set of TSCs and choosing the first TSC from a first or a second set of TSCs.

17. The method of claim 15, further comprising being informed by the second MS that the second MS is capable of using two TSCs simultaneously.

* * * * *